(12) United States Patent
Kunugise et al.

(10) Patent No.: US 10,817,995 B2
(45) Date of Patent: Oct. 27, 2020

(54) IMAGE PROCESSING DEVICE, IMAGE PROCESSING SYSTEM, IMAGE PROCESSING METHOD, AND IMAGING OPTICAL SYSTEM GROUP

(71) Applicant: FUJIFILM Corporation, Tokyo (JP)

(72) Inventors: Takashi Kunugise, Saitama (JP);
Yousuke Naruse, Saitama (JP);
Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 49 days.

(21) Appl. No.: 16/281,109

(22) Filed: Feb. 21, 2019

(65) Prior Publication Data
US 2019/0180426 A1   Jun. 13, 2019

Related U.S. Application Data

(63) Continuation of application No. PCT/JP2017/026657, filed on Jul. 24, 2017.

(30) Foreign Application Priority Data

Aug. 25, 2016   (JP) .................. 2016-165060

(51) Int. Cl.
*G06K 9/40*   (2006.01)
*G06T 5/20*   (2006.01)
(Continued)

(52) U.S. Cl.
CPC ............... *G06T 5/20* (2013.01); *G06T 5/003* (2013.01); *H04N 5/232* (2013.01)

(58) Field of Classification Search
None
See application file for complete search history.

(56) References Cited

U.S. PATENT DOCUMENTS 5,307,175 A * 4/1994 Seachman .......... H04N 1/00002
348/241
6,144,499 A * 11/2000 Yokota .................. G02B 13/16
359/649

(Continued)

FOREIGN PATENT DOCUMENTS

CN    105009579    10/2015
CN    105493497    4/2016
(Continued)

OTHER PUBLICATIONS

"International Search Report (Form PCT/ISA/210) of PCT/JP2017/026657," dated Sep. 26, 2017, with English translation thereof, pp. 1-5.
(Continued)

*Primary Examiner* — Sean M Conner
(74) *Attorney, Agent, or Firm* — JCIPRNET

(57) ABSTRACT

Provided are an image processing device, an image processing system, an image processing method, and an imaging optical system group capable of suppressing an increase in costs and appropriately restoring an image. In the imaging optical system, in a case where a first MTF curve M1 indicating an MTF value in a first azimuth direction with respect to an amount of defocus from a focal position is compared with a second MTF curve M2 indicating an MTF value in a second azimuth direction with respect to the amount of defocus from the focal position, a ratio of a peak value P1 of the first MTF curve M1 to a peak value P2 of the second MTF curve M2 is equal to or greater than 2, and a ratio of a half-value width HW2 of the second MTF curve M2 to a half-value width HW1 of the first MTF curve M1 is equal to or greater than 1.25. The restoration filter is a common filter corresponding to a representative value of (Continued)

transfer functions in a plurality of same type imaging optical systems.

9 Claims, 5 Drawing Sheets

(51) Int. Cl.
*H04N 5/232* (2006.01)
*G06T 5/00* (2006.01)

(56) References Cited

U.S. PATENT DOCUMENTS

| | | | |
|---|---|---|---|
| 9,727,955 B2 | 8/2017 | Naruse et al. | |
| 9,984,448 B2 | 5/2018 | Naruse et al. | |
| 9,984,449 B2 | 5/2018 | Naruse et al. | |
| 10,083,500 B2 | 9/2018 | Naruse et al. | |
| 2012/0293863 A1* | 11/2012 | McMullen | G02B 21/33 |
| | | | 359/385 |
| 2016/0027157 A1 | 1/2016 | Naruse | |
| 2016/0295158 A1 | 10/2016 | Van Belle | |
| 2017/0148145 A1* | 5/2017 | Campbell | G06T 3/60 |

FOREIGN PATENT DOCUMENTS

| | | |
|---|---|---|
| JP | 2011188454 | 9/2011 |
| JP | 2011193277 | 9/2011 |
| JP | 2012235421 | 11/2012 |
| JP | 2014021313 | 2/2014 |
| JP | 2014115303 | 6/2014 |
| JP | 2015004883 | 1/2015 |
| JP | 2015216576 | 12/2015 |
| JP | 2016092742 | 5/2016 |
| WO | 2014148074 | 9/2014 |

OTHER PUBLICATIONS

"Written Opinion of the International Searching Authority (Form PCT/ISA/237) of PCT/JP2017/026657," dated Sep. 26, 2017, with English translation thereof, pp. 1-9.

"Office Action of China Counterpart Application", dated Jun. 19, 2020, with English translation thereof, pp. 1-11.

* cited by examiner

IMAGE PROCESSING DEVICE, IMAGE PROCESSING SYSTEM, IMAGE PROCESSING METHOD, AND IMAGING OPTICAL SYSTEM GROUP

CROSS-REFERENCE TO RELATED APPLICATIONS

The present application is a Continuation of PCT International Application No. PCT/JP2017/026657 filed on Jul. 24, 2017 claiming priority under 35 U.S.C § 119(a) to Japanese Patent Application No. 2016-165060 filed on Aug. 25, 2016. Each of the above applications is hereby expressly incorporated by reference, in their entirety, into the present application.

BACKGROUND OF THE INVENTION

1. Field of the Invention

The present invention relates to an image processing device, an image processing system, an image processing method, and an imaging optical system group capable of suppressing an increase in costs and appropriately restoring an image in a case of performing restoration processing on degradation of resolution of the image caused by aberrations of the imaging optical system.

2. Description of the Related Art

In an image generated by using the imaging optical system, the resolution is degraded by aberrations for each imaging optical system. Such degradation of resolution caused by aberration can be expressed by a transfer function for each imaging optical system such as a point spread function (PSF) and an optical transfer function (OTF). Generally, by performing image processing on an image through a restoration filter (hereinafter referred to as an "individual filter") which is individually created for each imaging optical system on the basis of a transfer function for each imaging optical system, degraded components caused by aberrations is reduced. Such image processing is generally called "restoration processing", "point image restoration processing", "image restoration processing", and the like.

In description of JP2012-235421A, a restoration filter (image restoration filter) common to a plurality of imaging optical systems and individual correction information for correcting individual differences are provided, image restoration processing is performed on the input image, which is generated using a specific imaging optical system, through the common restoration filter, and correction processing for individual differences is performed using individual correction information.

In description of JP2014-021313A, an imaging optical system, of which an amount of lateral aberration is within a predetermined allowable range in the in-focus state at the intermediate object distance and the infinite object distance on the premise that restoration processing (image restoration processing) is performed, is used.

In description of JP2015-004883A, a depth of field with respect to the image center is enlarged by providing a phase plate that adds only spherical aberration to the imaging optical system.

In description of JP2011-188454A, a depth of field is enlarged by performing restoration processing through an imaging optical system in which an MTF curve indicating an MTF value with respect to an amount of defocus is shifted in the so-called sagittal direction and the so-called tangential direction.

SUMMARY OF THE INVENTION

The numbers of pixels of imaging elements of imaging apparatuses such as digital cameras have increased, and accordingly, resolutions of images at high spatial frequencies become degraded. Explaining this by using an optical transfer function which is a specific indicator relating to the aberration of the imaging optical system, at the peripheral image height, the difference between modulation transfer function (MTF) values (hereinafter simply referred to as an "S/T difference") in the so-called sagittal direction and the so-called tangential direction tends to occur. Here, the sagittal direction corresponds to the circumferential direction of a circle centered on the optical axis. Further, the tangential direction corresponds to the radial direction of a circle centered on the optical axis. In a case where the S/T difference is large, an image is blurred at the peripheral portion of the image.

It is conceivable that the S/T difference can be classified into S/T difference due to design and S/T difference due to manufacturing. In order to suppress the S/T difference due to the design, for example, the number of lenses and the outer diameter dimension increase. In order to suppress the S/T difference (mainly component tolerance and assembly tolerance) due to manufacturing, an increase in costs for suppressing the S/T difference tends to occur. On the other hand, it is conceivable that the S/T difference can be reduced by performing restoration processing through a restoration filter. This corresponds to performing image processing for reducing the difference in MTF value between the two directions through an anisotropic filter. From the viewpoint of minimizing the S/T difference, it is ideal to create individual filters for each imaging optical system, but the creation of individual filters results in a significant increase in costs.

In order to avoid an increase in costs caused by the creation of individual filters, it is conceivable to employ a common filter that is used in common to a plurality of same type imaging optical systems. However, there is a problem that, by merely employing the common filter, the individual variation rather is increased by essentially amplifying the MTF with one or more gains.

Since the technique described in JP2012-235421A employs the common filter, as compared with a case of using the individual filter, it is possible to certainly suppress an increase in amount of data dedicated to the filter. However, it is necessary to perform correction processing on the individual difference on the basis of the individual correction information. In description of JP2012-235421A, the individual correction information is set as information simply indicating a degree of "partial blurring" (for example, left-right asymmetric degradation in image). Thus, the information can be easily created as compared with a case of measuring the optical transfer function. However, in order to create individual correction information corresponding to not only the "partial blurring" but also all factors relating to manufacturing errors, as in the case of measuring the optical transfer function, that is, as in the case of creating the individual filter, it is conceivable that costs remarkably increase. Further, according to the technique described in JP2012-235421A, it can be said that it is difficult to appropriately cope with the S/T difference (difference in MTF value between two directions). Basically, JP2012-235421A does not describe a relationship between the amount of defocus from the in-focus position and the MTF value relating to the aberration and the S/T difference thereof.

The technique described in JP2014-021313A employs an imaging optical system in which the amount of lateral aberration is within a predetermined allowable range in the in-focus state at the intermediate object distance and the infinite distance. Even in this technique, it can be said that it is difficult to appropriately cope with the S/T difference (the difference in MTF value between the two directions).

Although JP2015-004883A and JP2011-188454A each disclose a technique relating to an increase in depth of field, there is no mention about optical characteristics of an imaging optical system suitable for using a common filter.

The present invention has been made in consideration of the above-mentioned situations, and it is an object of the present invention to provide an image processing device, an image processing system, an image processing method, and an imaging optical system group capable of suppressing an increase in costs and appropriately restoring an image in a case of performing restoration processing on degradation of resolution of the image caused by aberrations of the imaging optical system.

In order to achieve the above object, an image processing device according to a first aspect comprises: an image acquisition section that acquires an image; a filter acquisition section that acquires a restoration filter corresponding to a transfer function of an imaging optical system used for generating the image; and a restoration processing section that performs restoration processing on the acquired image through the acquired restoration filter. In the imaging optical system, in a case where a first MTF curve indicating an MTF value in a first azimuth direction with respect to an amount of defocus from a focal position during focusing on an optical axis is compared with a second MTF curve indicating an MTF value in a second azimuth direction with respect to the amount of defocus from the focal position, a peak value of the second MTF curve is less than a peak value of the first MTF curve, a ratio of the peak value of the first MTF curve to the peak value of the second MTF curve is equal to or greater than 2, a half-value width of the second MTF curve is greater than a half-value width of the first MTF curve, and a ratio of the half-value width of the second MTF curve to the half-value width of the first MTF curve is equal to or greater than 1.25. In addition, the restoration filter is a common filter corresponding to a representative value of transfer functions in a plurality of same type imaging optical systems including the imaging optical system.

According to this aspect, in a case where the restoration processing is performed on the degradation of the resolution of the image caused by the aberrations of the imaging optical system, the common filter corresponding to the representative value of the transfer functions in the plurality of same type imaging optical systems is used as the restoration filter, and the restoration processing is performed on the image using the imaging optical system. In the imaging optical system, the ratio of the peak values of the MTF curves and the ratio of the half-value widths (each of which is an indicator indicating the depth in the direction of the optical axis of the MTF value) in the azimuth directions is in the above-mentioned specified range (the ratio of peak values is equal to or greater than 2 and the ratio of half-value widths is equal to or greater than 1.25). With such a configuration, an increase in costs can be suppressed and the image can be properly restored.

In the image processing device according to a second aspect of the present invention, the first azimuth direction is a circumferential direction of a circle centered on the optical axis of the imaging optical system, and the second azimuth direction is a radial direction of the circle.

In the image processing device according to a third aspect of the present invention, the restoration filter is a zero-phase restoration filter that makes the restoration processing non-executable on the acquired image in terms of the phase. According to this aspect, artifacts can be prevented from occurring.

In the image processing device according to a fourth aspect of the present invention, the ratio of the peak value of the first MTF curve to the peak value of the second MTF curve is equal to or greater than 4.

In the image processing device according to a fifth aspect of the present invention, the ratio of the peak value of the first MTF curve to the peak value of the second MTF curve is equal to or greater than 10.

In the image processing device according to a sixth aspect of the present invention, the ratio of the half-value width of the second MTF curve to the half-value width of the first MTF curve is equal to or greater than 3.

An image processing system according to a seventh aspect of the present invention comprises: an imaging optical system that, in a case where a first MTF curve indicating an MTF value in a first azimuth direction with respect to an amount of defocus during focusing on an optical axis is compared with a second MTF curve indicating an MTF value in a second azimuth direction with respect to the amount of defocus, a peak value of the second MTF curve is less than a peak value of the first MTF curve, a ratio of the peak value of the first MTF curve to the peak value of the second MTF curve is equal to or greater than 2, a half-value width of the second MTF curve is greater than a half-value width of the first MTF curve, and a ratio of the half-value width of the second MTF curve to the half-value width of the first MTF curve is equal to or greater than 1.25; an image acquisition section that acquires an image generated by using the imaging optical system; a filter acquisition section that acquires a restoration filter which is a common filter corresponding to a representative value of transfer functions in a plurality of same type imaging optical systems including the imaging optical system, the restoration filter corresponding to the transfer function of the imaging optical system; and a restoration processing section that performs restoration processing on the acquired image through the acquired restoration filter.

An image processing method according to an eighth aspect of the present invention comprises: acquiring an image generated using an imaging optical system that, in a case where a first MTF curve indicating an MTF value in a first azimuth direction with respect to an amount of defocus during focusing on an optical axis is compared with a second MTF curve indicating an MTF value in a second azimuth direction with respect to the amount of defocus, a peak value of the second MTF curve is less than a peak value of the first MTF curve, a ratio of the peak value of the first MTF curve to the peak value of the second MTF curve is equal to or greater than 2, a half-value width of the second MTF curve is greater than a half-value width of the first MTF curve, and a ratio of the half-value width of the second MTF curve to the half-value width of the first MTF curve is equal to or greater than 1.25; and performing restoration processing on the acquired image through a restoration filter which is a common filter corresponding to a representative value of transfer functions in a plurality of same type imaging optical systems including the imaging optical system, the restoration filter corresponding to the transfer function of the imaging optical system.

An imaging optical system group according to a ninth aspect of the present invention comprises: an imaging optical system that, in a case where a first MTF curve indicating an MTF value in a first azimuth direction with respect to an amount of defocus during focusing on an optical axis is compared with a second MTF curve indicating an MTF value in a second azimuth direction with respect to the amount of defocus, a peak value of the second MTF curve is less than a peak value of the first MTF curve, a ratio of the peak value of the first MTF curve to the peak value of the second MTF curve is equal to or greater than 2, a half-value width of the second MTF curve is greater than a half-value width of the first MTF curve, and a ratio of the half-value width of the second MTF curve to the half-value width of the first MTF curve is equal to or greater than 1.25; and a storage medium that stores a restoration filter which is a common filter corresponding to a representative value of transfer functions in a plurality of same type imaging optical systems including the imaging optical system, the restoration filter corresponding to the transfer function of the imaging optical system.

According to the present invention, it is possible to suppress an increase in costs and appropriately restore an image in a case of performing the restoration processing on the degradation of resolution of the image caused by the aberrations of the imaging optical system.

DESCRIPTION OF THE PREFERRED EMBODIMENTS

Hereinafter, embodiments for implementing an image processing device, an image processing system, an image processing method, and an imaging optical system group according to the present invention will be described with reference to the accompanying drawings.

Figure 1:
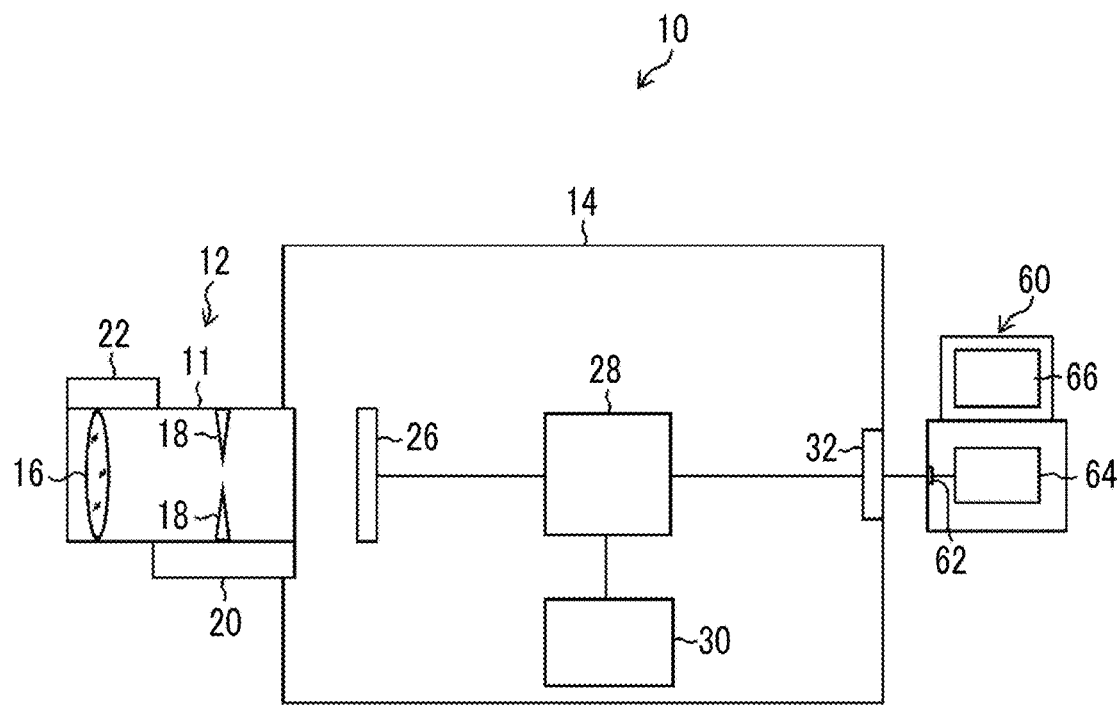
FIG. 1 is a block diagram illustrating a configuration example of an imaging apparatus connectable to a computer.

FIG. 1 is a block diagram illustrating a configuration example of an imaging apparatus connectable to a computer.

The imaging apparatus 10 of the present embodiment comprises a lens unit 12 including an imaging optical system 11 and a camera body 14 (a form of "image processing device") that performs image processing on an image generated by using the imaging optical system 11).

The imaging optical system 11 of the lens unit 12 is configured to include a lens 16 and a stop 18. The lens unit 12 is configured to include not only the imaging optical system 11 but also an optical system controller 20 that controls the imaging optical system 11, and an illumination device 22. The optical system controller 20 is composed of, for example, a central processing unit (CPU). The illumination device 22 is composed of, for example, a white light emitting diode (LED).

The camera body 14 is configured to include an imaging element 26, a camera body controller 28, a storage section 30, and an input/output interface 32. The imaging element 26 is composed of, for example, a complementary metal oxide semiconductor (CMOS) type image sensor or a charge coupled device (CCD) type image sensor. The camera body controller 28 is composed of, for example, a CPU. The storage section 30 is composed of a non-transitory storage device and a transitory storage device. The non-transitory storage device is composed of, for example, a read only memory (ROM) and an electrically erasable programmable read only memory (EEPROM). The transitory storage device is, for example, a random access memory (RAM). The input/output interface 32 is configured to include an input/output terminal.

Figure 2:
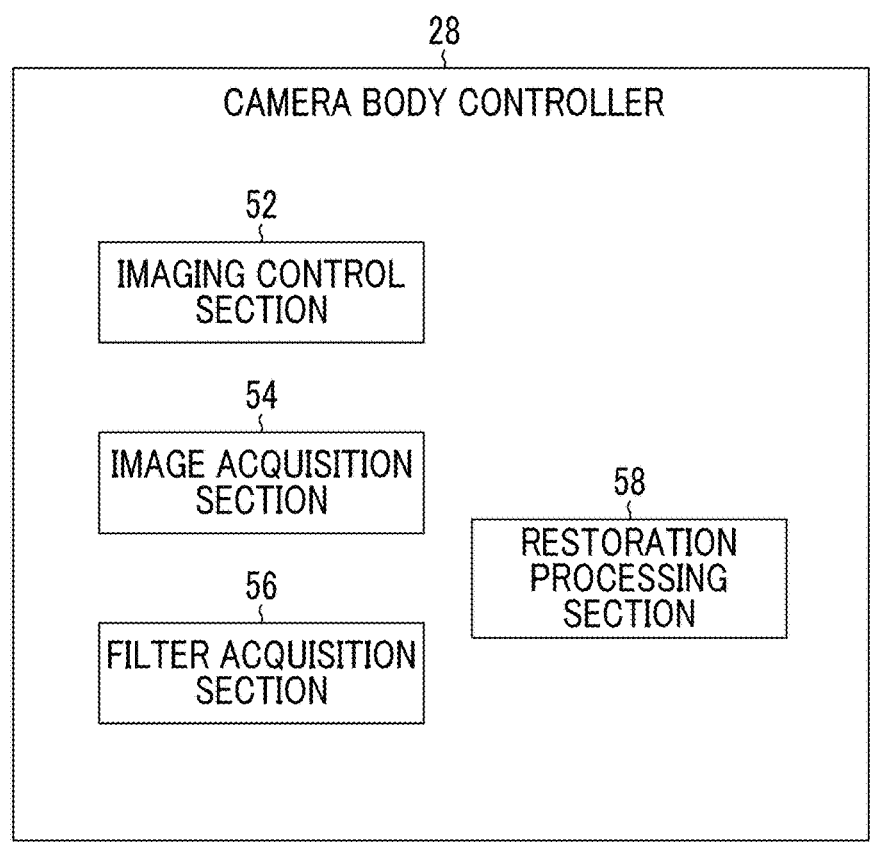
FIG. 2 is a block diagram illustrating a configuration example of a camera body controller.

As shown in FIG. 2, the camera body controller 28 in the present example comprises: an imaging control section 52 that controls the imaging element 26 and the lens unit 12; an image acquisition section 54 that acquires an image captured by the imaging element 26; a filter acquisition section 56 that acquires a restoration filter corresponding to a transfer function of the imaging optical system 11 used for generating an image; and a restoration processing section 58 that performs restoration processing on the image, which is acquired by the image acquisition section 54, through the restoration filter acquired by the filter acquisition section 56. The restoration filter of the present example is acquired from the storage section 30.

The computer 60 is configured to include an input/output interface 62, a computer controller 64, and a display 66. The input/output interface 62 is configured to include input/output terminals. The computer controller 64 is composed of, for example, a CPU. The display 66 is composed of a display device such as a liquid crystal display (LCD).

Figure 3:
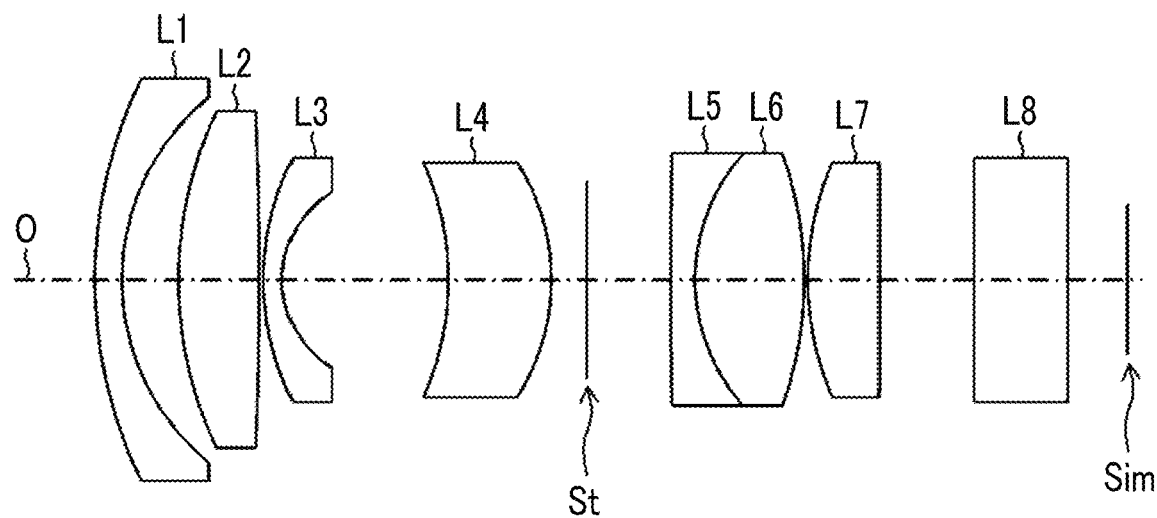
FIG. 3 is a diagram illustrating an example of an imaging optical system.

FIG. 3 is a diagram illustrating an example of the imaging optical system 11. The imaging optical system 11 of the present example is configured to include a plurality of lenses L1, L2, L3, L4, L5, L6, L7, and L8 as the lens 16 in FIG. 1. St in the drawing corresponds to the stop 18 in FIG. 1. In addition, Sim in the drawing is an image plane.

Degradation in resolution of an image due to aberrations in the plurality of lenses L1 to L8 of the imaging optical system 11 can be represented by an optical transfer function. Further, the amount of defocus represents an amount of deviation from the in-focus position in the direction along the optical axis O of the imaging optical system 11 (referred to as a "direction of the optical axis"). The amount of deviation is changed by the focus control on the imaging optical system 11 of the optical system controller 20. The amount of defocus is sometimes called "amount of focus shift". The MTF value with respect to the amount of defocus of the imaging optical system 11 is represented by an MTF curve described in detail later. Here, the MTF value is an amplitude component of the optical transfer function.

[Restoration Filter]

In the present invention, a common filter is used as the restoration filter. The common filter is a restoration filter corresponding to the representative value of the optical transfer functions in a plurality of same type imaging optical systems (hereinafter referred to as a "population"). For example, the common filter is created by calculating an average value of MTF values of optical transfer functions of the population as a representative value and finding filter coefficients corresponding to the representative value. Incidentally, the "representative value" is not limited to the average value of the population, and for example, the median value of the population may be used.

Further, "the same type" of the imaging optical system indicates a plurality of imaging optical systems having the same specifications without consideration of individual variation, manufacturing error, or the like.

Imaging is performed using the same type imaging optical systems as the population used for creating the common filter, and the restoration processing is performed on the image, which is obtained by the imaging, through the common filter.

It is assumed that a design value of a parameter indicating the optical characteristics of the imaging optical system 11 is p and a change in the optical characteristic parameter due to the individual variation is Δp. The optical transfer function (also called "complex transfer function") at spatial frequencies ωx and ωy is indicated by OTF(ωx, ωy|p). In a case where a probability distribution P(Δp) of the individual variation of the imaging optical system 11 is known, a representative value μ(ωx, ωy) represented by the following expression is obtained.

$$\mu(\omega_x,\omega_y)=\int OTF(\omega_x,\omega_y|p+\Delta p)P(\Delta p)d\Delta p$$

In a case where an average value of the population is close to the design value, the OTF(ωx, ωy|p) of the design value may be adopted as the representative value μ(ωx, ωy) as represented by the following expression.

$$\mu(\omega_x,\omega_y)=OTF(\omega_x,\omega_y|p)$$

In a case of creating a Wiener filter as the common filter, the frequency characteristic f(ωx, ωy) is represented by the following expression with the representative value μ(ωx, ωy) as a degradation process.

$$f(\omega_x, \omega_y) = \frac{\mu^*(\omega_x, \omega_y)S(\omega_x, \omega_y)}{\|\mu(\omega_x, \omega_y)\|^2 S(\omega_x, \omega_y) + N(\omega_x, \omega_y)}$$

Here, S(ωx, ωy) is an average signal power of the image, N(ωx, ωy) is an average noise power of the image, and μ*(ωx, ωy) is a complex conjugate of the representative value μ(ωx, ωy). In addition, the following expression is established.

$$\|\mu(\omega_x,\omega_y)\|=\sqrt{\mu(\omega_x,\omega_y)\mu^*(\omega_x,\omega_y)}$$

In addition, in order to create a two-dimensional finite impulse response (FIR) filter with a limited number of taps as the common filter, a filter coefficient (also referred to as a "tap coefficient") is calculated by using an optimization method with known constraints. The filter coefficient is most approximated to the frequency characteristic f(ωx, ωy).

In a case where asymmetry of a point image greatly affects individual variation, a zero-phase restoration filter defined by the following expression may be used.

$$f(\omega_x, \omega_y) = \frac{\|\mu(\omega_x, \omega_y)\|S(\omega_x, \omega_y)}{\|\mu(\omega_x, \omega_y)\|^2 S(\omega_x, \omega_y) + N(\omega_x, \omega_y)}$$

The zero-phase restoration filter makes the restoration processing non-executable on the acquired image in terms of the phase. That is, in the acquired image, the restoration processing is performed only on the MTF among the optical transfer functions. By using the zero-phase restoration filter, although the correction effect of symmetrizing the asymmetric components of the point image can not be obtained, the risk of occurrence of artifacts in the image including individual variation can be reduced.

[Limitation of Optical Characteristics of Imaging Optical System]

Figure 4:
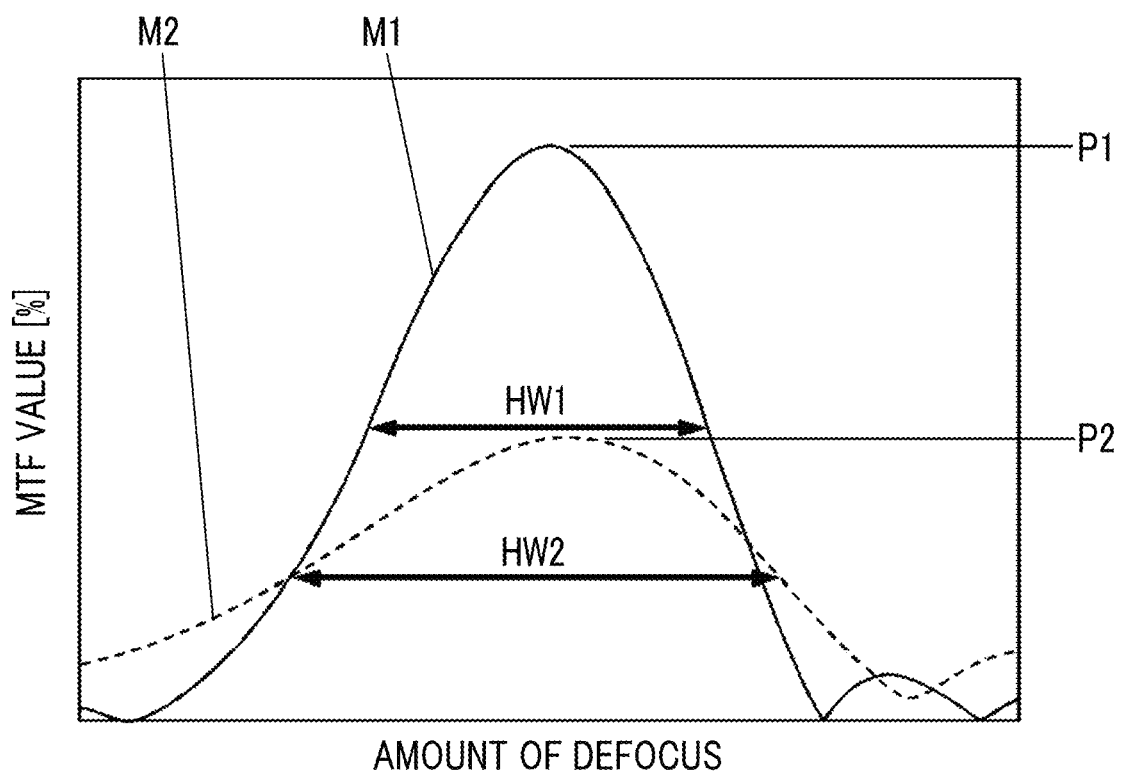
FIG. 4 is a graph of an MTF curve indicating an MTF value with respect to an amount of defocus at an image height of 80% in an example of the imaging optical system according to the present invention.

FIG. 4 shows an MTF value with respect to an amount of defocus at an image height of 80% in an example of the imaging optical system according to the present invention. In this drawing, the first MTF curve M1 indicates an MTF value with respect to an amount of defocus in a first azimuth direction. The second MTF curve M2 shows an MTF value with respect to an amount of defocus in a second azimuth direction.

The azimuth direction is a generic name in a direction orthogonal to the optical axis of the imaging optical system 11. In other words, the azimuth direction indicates the azimuth in the plane orthogonal to the optical axis. The first azimuth direction is, for example, a circumferential direction (hereinafter referred to as a "sagittal direction") of a circle centered on the optical axis of the imaging optical system 11. Further, the second azimuth direction is, for example, a radial direction (hereinafter referred to as a "tangential direction") of a circle centered on the optical axis of the imaging optical system 11. Both the sagittal direction and the tangential direction are orthogonal to the optical axis. In addition, the sagittal direction and the tangential direction are orthogonal to each other.

The amount of defocus indicates an amount of deviation (amount of shift) from a specific in-focus position (also referred to as a "focus position"). In other words, the amount of defocus is an amount of deviation (amount of shift) of the actual in-focus position in the direction of the optical axis in a case of focusing on the optical axis. The amount of defocus may be referred to as an "amount of focus shift" or an "amount of shift of the focal point" in some cases.

The MTF value is a value indicating the MTF which is an amplitude component of the optical transfer function (OTF).

The image height of 80% is an image height corresponding to 80% of the maximum image height. That is, it corresponds to 80% of the maximum distance from the optical axis to the image point on the image plane (light receiving surface of the imaging element 26). The image plane corresponds to the image.

Comparing the first MTF curve M1 and the second MTF curve M2, a peak value P2 of the second MTF curve M2 is less than a peak value P1 of the first MTF curve M1, and a half-value width HW2 of the second MTF curve M2 is greater than a half-value width HW1 of the first MTF curve M1.

In the present invention, an imaging optical system in which the peak value ratio of the MTF curves and the half-value width ratio of the MTF curves between azimuth directions are as follows is used.

Peak value ratio: the ratio of the peak value P1 of the first MTF curve M1 to the peak value P2 of the second MTF curve M2 is equal to or greater than 2. The ratio of the peak value is preferably equal to or greater than 4, and more preferably equal to or greater than 10. In other words, as compared with the peak value P2 of the second MTF curve M2, the peak value P1 of the first MTF curve M1 is equal to or greater than twice, preferably equal to or greater than 4 times, and more preferably equal to or greater than 10 times.

Although the upper limit of the peak value ratio is not particularly limited, in a case where the peak value P2 of the second MTF curve M2 is small, a high gain is necessary in order to increase the MTF value in the second azimuth direction.

Half-value width ratio: the ratio of the half-value width HW1 of the first MTF curve M1 to the half-value width HW2 of the second MTF curve M2 is equal to or greater than 1.25, and preferably equal to or greater than 3. That is, as compared with the half-value width HW1 of the first MTF curve M1, the half-value width HW2 of the second MTF curve M2 is equal to or greater than 1.25 times, and more preferably equal to or greater than 3 times.

The upper limit of the half-value width ratio is not particularly limited. However, in a case where the half-value width HW1 of the first MTF curve M1 is small, that is, in a case where the depth in the first azimuth direction is small, a change in the MTF value increases relative to a change in the amount of defocus in the first azimuth direction.

[Flow of Image Processing]

Figure 5:
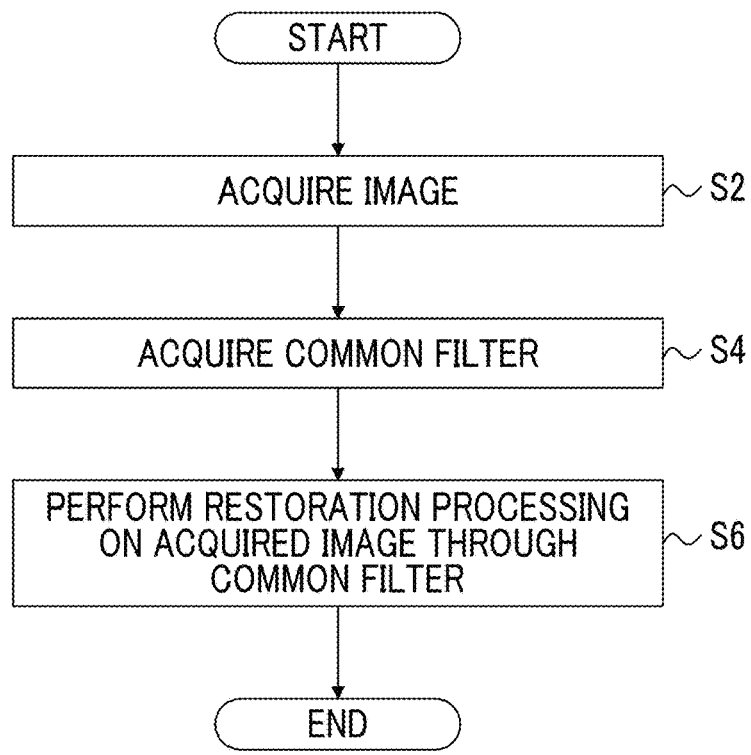
FIG. 5 is a flowchart schematically illustrating a flow of an image processing example to which an image processing method according to the present invention is applied.

FIG. 5 is a flowchart schematically illustrating a flow of an image processing example to which an image processing method according to the present invention is applied. This processing is executed by the camera body controller 28 of FIG. 2 through a program stored in advance in the storage section 30.

First, the image acquisition section 54 acquires an image generated using the imaging optical system 11 having the optical characteristics shown in FIG. 4 (step S2).

Next, the filter acquisition section 56 acquires a common filter created from a population of the same type imaging optical systems 11 (a plurality of imaging optical systems) used for imaging (step S4). It should be noted that the present invention is not limited to the case where the imaging optical system 11 is included in the population, and may be the case where the imaging optical system 11 is not included in the population.

Next, the restoration processing section 58 performs restoration processing on the image acquired in step S2 through the common filter acquired in step S4 (step S6).

[Significant Relationship Between MTFs of Common Filter and Imaging Optical System]

A significant relationship between the MTFs of the common filter and the imaging optical system in the present invention will be described.

Figure 6:
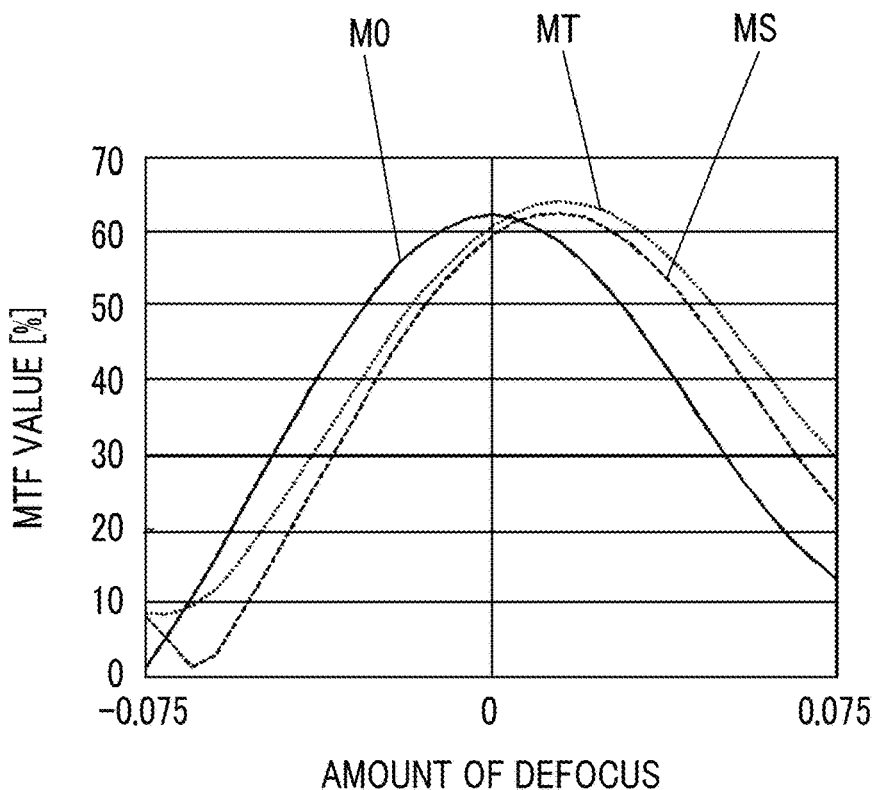
FIG. 6 is a graph of an MTF curve indicating an MTF value with respect to an amount of defocus in an example of an ideal imaging optical system.

First, an MTF of an ideal imaging optical system which does not require restoration processing will be described. FIG. 6 is a graph of an MTF curve indicating an MTF value with respect to an amount of defocus in an example of the ideal imaging optical system. The MTF curve M0 shows the MTF value with respect to the amount of defocus at the center (zero image height). The MTF curve MS shows the MTF value with respect to the amount of defocus in the sagittal direction (hereinafter abbreviated as an "S direction") at the image height of 80%. The MTF curve MT shows the MTF value with respect to the amount of defocus in the tangential direction (hereinafter abbreviated as a "T direction") at an image height of 80%. Comparing the MTF curve MS in the S direction and the MTF curve MT in the T direction at the peripheral image height of the imaging optical system (image height of 80% in this drawing), the peak values are almost the same and half-value widths, which are indicators indicating the depths, are almost the same. In a case where such an ideal imaging optical system is intended to be used, in order to reduce the MTF difference between the two directions, the number of lenses and the outer diameter dimension generally increase in the design, and the manufacturing costs for suppressing the component tolerance and the assembly tolerance generally become high.

On the other hand, in order to use an imaging optical system having a large MTF difference between the two directions described with reference to FIG. 4, generally in the related art, an individual restoration filter (hereinafter referred to as "individual filter") is created for each imaging optical system, and the restoration processing is performed. However, creating an individual filter contributes to saving the costs of designing and manufacturing the imaging optical system, but high costs are necessary for creating the individual filter. Therefore, in the present invention, as described above in detail, a common filter (which is a restoration filter common to a plurality of same type imaging optical systems) is used. However, in a case of using the common filter, it is necessary to avoid overcorrection for individual variations in MTFs.

Next, the MTF curve of the general imaging optical system requiring the restoration processing will be described. As shown in FIG. 4, the peak value of the MTF curve in the T direction tends to become less than the peak value of the MTF curve in the S direction at the peripheral image height. The following factors 1 to 3 may be used as the factors.

Factor 1: in a case where a wide-angle lens is employed as the lens of the imaging optical system, generally vignetting occurs, and as a result, the MTF value in the T direction decreases.

Factor 2: lateral chromatic aberration occurs in the T direction, and the MTF value in the T direction decreases.

Factor 3: coma aberration occurs and the MTF value decreases. Coma aberration in the T direction is aberration asymmetric to the principal ray, and thus it is difficult to perform control. That is, the MTF value in the T direction tends to be less than the MTF value in the S direction.

However, depending on the imaging optical system, the peak value in the S direction may be less than the peak value in the T direction in some cases.

Figure 7:
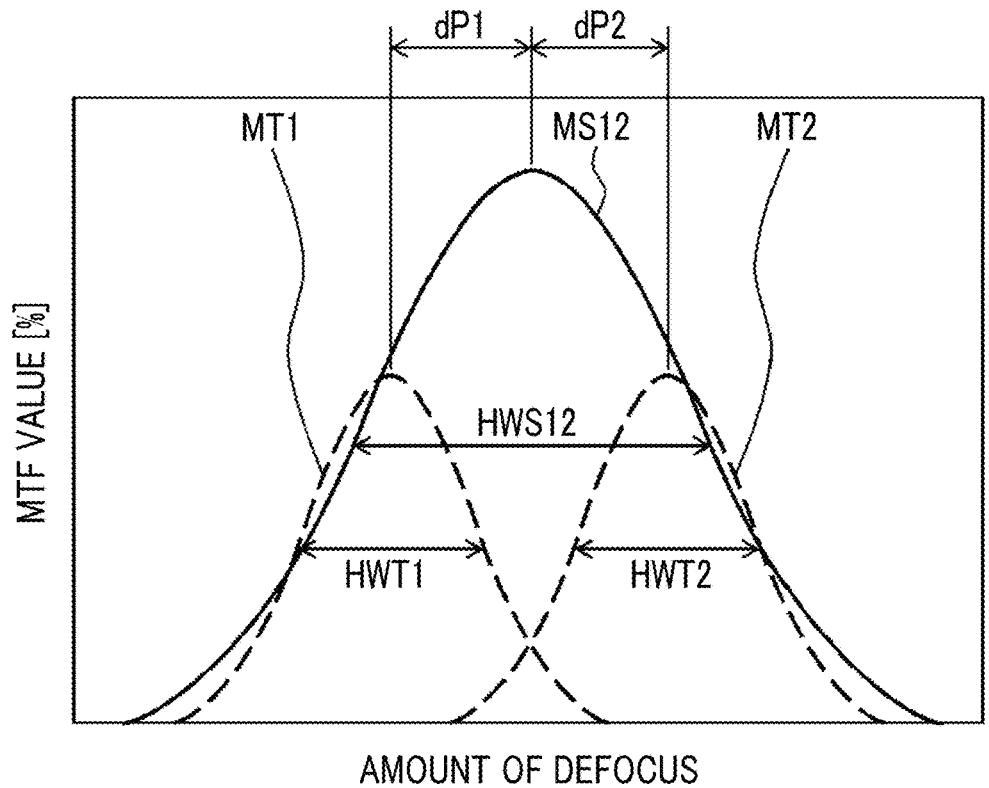
FIG. 7 is a schematic diagram illustrating an MTF curve of an example of an imaging optical system incompatible with a common filter.
Figure 8:
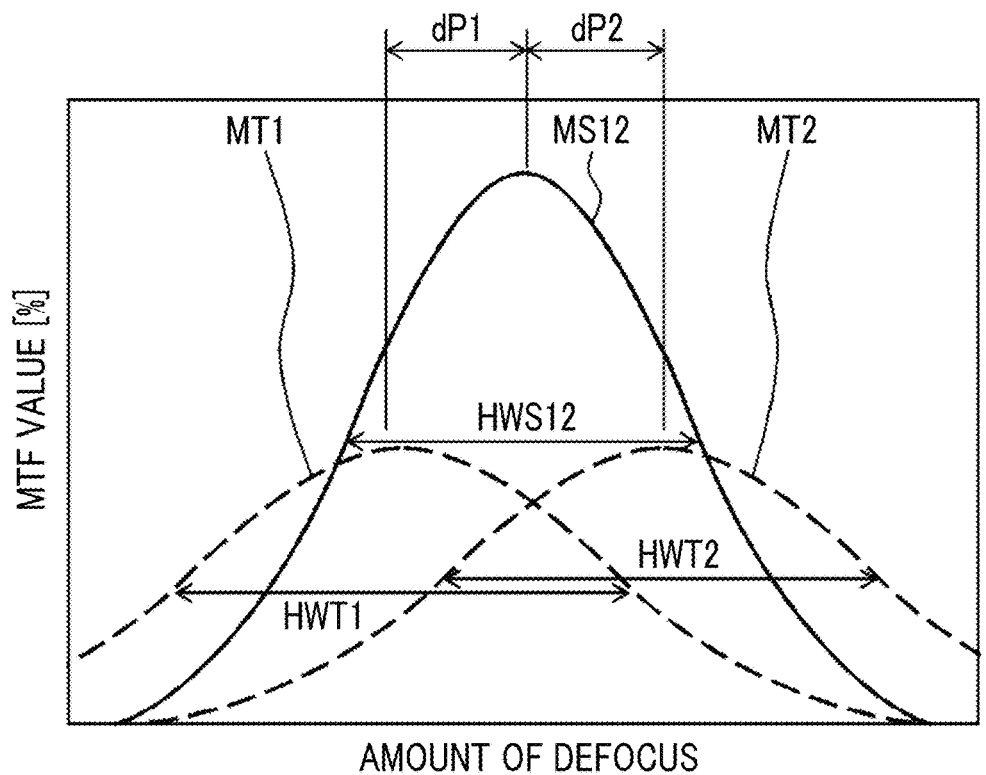
FIG. 8 is a schematic diagram illustrating an MTF curve of an example of an imaging optical system suitable for the common filter.

Next, among the general imaging optical systems requiring the restoration processing, the imaging optical system incompatible with the common filter and the imaging optical system suitable for the common filter will be described with reference to schematic diagrams of FIGS. 7 and 8. FIG. 7 is a schematic diagram illustrating an MTF curve of an example of the imaging optical system incompatible with the common filter. FIG. 8 is a schematic diagram illustrating an MTF curve of an example of the imaging optical system suitable for the common filter. In FIGS. 7 and 8, since the MTF curve in the T direction generally has a large individual variation, two MTF curves MT1 and MT2 are shown as an example. Here, the MTF curve MT1 represents the MTF value with respect to the amount of defocus of the first imaging optical system in the T direction, and the MTF curve MT2 represents the MTF value with respect to the amount of defocus of the second imaging optical system having the same type as the first imaging optical system in the T direction. Since the MTF curve in the S direction is generally less than the MTF curve in the T direction, individual variations thereof are ignored, and one MTF curve MS12 is shown as an example thereof. That is, the MTF curve MS12 indicates the MTF value with respect to the amount of defocus of the first imaging optical system and the second imaging optical system in the S direction. In addition, there are generally amount of deviations dP1 and dP2 in the peak position of the MTF curve MS12 in the S direction and the peak positions of the MTF curves MT1 and MT2 in the T direction.

As shown in FIG. 7, in a case where the half-value widths HWT1 and HWT2 of the MTF curves MT1 and MT2 in the T direction are small, that is, in a case where the depths of the MTF curves MT1 and MT2 in the T direction are insufficient, individual variations in manufacture cause tilting of the image plane. Thus, the relative peak position of the MTF curve in the S direction and the MTF curve in the T direction varies. Then, an amount of change in individual variation of the difference between the MTF value in the S direction and the MTF value in the T direction on the sensor surface becomes large. As a result, it can be seen that it becomes difficult to restore the point image by the common filter method (excessive correction or insufficient correction occurs).

On the other hand, as shown in FIG. 8, in a case where the half-value widths HWT1 and HWT2 of the MTF curves MT1 and MT2 in the T direction are large, that is, in a case where the depths of the MTF curves MT1 and MT2 in the T direction are sufficient, individual variations in manufacture cause tilting of the image plane. Thus, the relative peak position of the MTF curve in the S direction and the MTF curve in the T direction varies. Even in this case, since the MTF curve in one direction (the T direction) is gentle, the amount of change in individual variation of the difference between the MTF value in the S direction and the MTF value in the T direction on the sensor surface becomes small. As a result, it can be seen that the effect can be sufficiently exhibited by point image restoration using the common filter method.

That is, even in a case where the relative tilting due to individual variation between the S-direction image plane and the T-direction image plane of the lens occurs, the ratios of the half-value width HWS12 of the MTF curve MS12 in the S direction to the half-value widths HWT1 and HWT2 in the T direction are within an appropriate range. Then, it can be seen that the image can be restored satisfactorily even in a case where the common filter is used without an individual filter (even in a case where only constant gains can be applied to S direction and T direction respectively).

Here, the appropriate range means that the ratio of the half-value widths of the MTF curves in the two directions is equal to or greater than "1.25" and preferably equal to or greater than "3" in a case where the ratio of the peak values of the MTF curves in the two directions is equal to or greater than "2". The upper limit value of the ratio of the half-value widths is not particularly limited. This ratio is preferably greater than the ratio of the image plane sensitivities (T-direction image plane sensitivity÷S-direction image plane sensitivity) in the S direction and the T direction in a case where eccentricity occurs, and is within in the range of this value in consideration of the effects based on actual measurement.

Further, the present invention may be limited to an imaging optical system in which the ratio of the peak values of the MTF curves in the two directions is equal to or greater than "4" or equal to or greater than "10". For example, in a case where a wide-angle lens is employed as the lens of the imaging optical system, the ratio of the peak value may be large. Even in this case, by using the imaging optical system having a large half-value width ratio, it is possible to restore the image satisfactorily even through the common filter.

Depending on the type of imaging optical system, it is preferable to set the ratio of the peak values of the MTF curves in the two directions to "10" or less, or more preferably "4" or less within the range of "2" or more. For example, even in a case where the ratio of peak values is within the range of "2" or more and "10" or less, within the range of "2" or more and "4" or less, or within the range of "4" or more and "10" or less.

In the above description, the case where the two azimuth directions are the S direction and the T direction has been described as an example, but the present invention is not limited to such a case. The ratio of the peak values of the MTF curves and the ratio of the half-value widths in the two different azimuth directions may be within the appropriate range described above.

Although the case where the peripheral image height is an image height of 80% has been described as an example, it is preferable that the peripheral image height other than the image height of 80% be within the above-mentioned appropriate range.

Although the description of the condition of the spatial frequency is omitted, in a case where the spatial frequency is at least ½ Nyquist frequency of the imaging element, it is preferable that the MTF curve is within the above-mentioned appropriate range.

[About Verification of Appropriate Range of MTF Curve]

An example of verifying that the MTF curve of the imaging optical system is within an appropriate range of the present invention will be described.

It can be verified that the MTF curve is within an appropriate range at least under the following conditions.

Two azimuth directions: sagittal direction and tangential direction

Image height: image height of 80%

Spatial frequency: ½ Nyquist frequency of the imaging element

However, the conditions for verification that the MTF curve is within the appropriate range of the present invention are not particularly limited to the above case. The two azimuth directions are not limited to the sagittal direction and the tangential direction, but may be in two different directions orthogonal to the optical axis of the imaging optical system. That is, although the difference between the MTF values in the S direction and the T direction is most remarkable, the difference between MTF values in other directions may be verified. The image height is not limited to the image height of 80% and may be the image height (peripheral image height) of the peripheral portion that is separated from the optical axis. The spatial frequency is not limited to the ½ Nyquist frequency of the imaging element. For example, the ¼ Nyquist frequency of the imaging element may be used. Further, the wavelength of the light emitted from the light source to the subject is not particularly limited. It is possible to measure the MTF value by emitting so-called white light.

[Variation of Image Processing System]

Although the case where the camera body controller 28 of the imaging apparatus 10 performs the restoration processing has been described as an example with reference to FIGS. 1 and 2, the present invention is not limited to such a case.

Figure 9:
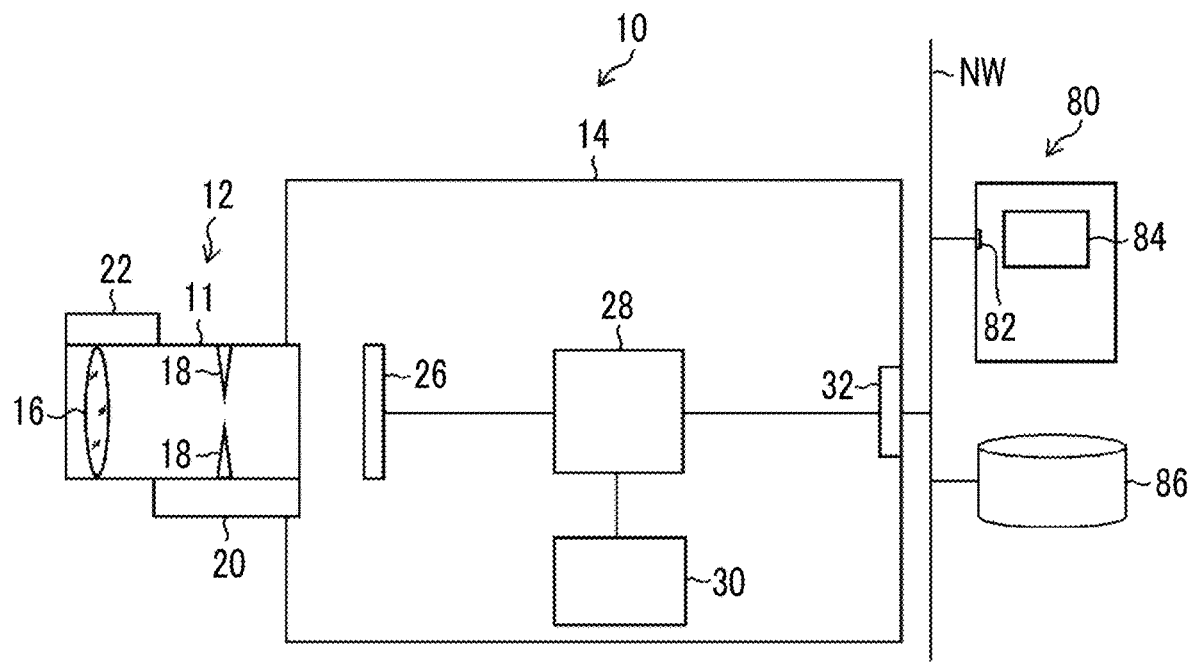
FIG. 9 is a system configuration diagram used for explaining a variation of an image processing system.

For example, as shown in FIG. 9, the server apparatus 80 connected to the imaging apparatus 10 may perform the restoration processing through the network NW. The server apparatus 80 in this drawing comprises an input/output interface 82 and a server controller 84. The server controller 84 is composed of, for example, a CPU. The server apparatus 80 of the present example is one form of the image processing device. The server controller 84 comprises the image acquisition section 54, the filter acquisition section 56, and the restoration processing section 58 shown in FIG. 2. The image acquisition section 54 in the present example acquires an image from the imaging apparatus 10 through the network NW. The filter acquisition section 56 of the present example acquires a restoration filter from the database 86 through the network NW.

The image processing device according to the present invention is not particularly limited to the case shown in FIG. 1 and the case shown in FIG. 9. In other words, there is no particular limitation in a case where the restoration processing is performed by the imaging apparatus and the server apparatus, and the present invention can be applied to the case where the restoration processing is performed by another apparatus.

[Imaging Optical System Group]

The present invention may be a group (imaging optical system group) including the imaging optical system 11 and a storage medium (non-transitory type medium) non-temporarily storing the restoration filter. Examples of non-transitory type media include, for example, memory cards, optical disks, and magnetic disks. However, the non-transitory type medium is not particularly limited as long as the medium temporarily stores the restoration filter. The non-transitory type medium may be a memory device, such as an EEPROM, that is mounted in advance in the apparatus.

Although the embodiments for carrying out the present invention have been described above, the present invention is not limited to the above-mentioned embodiments and modifications, and various modifications may be adopted without departing from the scope of the present invention.

EXPLANATION OF REFERENCES

10: imaging apparatus
11: imaging optical system
12: lens unit
14: camera body
16: lens
18: stop
20: optical system controller
22: illumination device
26: imaging element
28: camera body controller
30: storage section
32: input/output interface
52: imaging control section
54: image acquisition section
56: filter acquisition section
58: restoration processing section
60: computer
62: input/output interface
64: computer controller
66: display
80: server apparatus
82: input/output interface
84: server controller
86: database
HW1, HW2, HWS12, HWT1, HWT2: half-value width
L1, L2, L3, L4, L5, L6, L7, L8: lens
M0, M1, M2, MS, MS12, MT1, MT2: MTF curve
NW: network
O: optical axis (direction)
P1, P2: peak value
dP1, dP2: amount of deviation in peak position

What is claimed is:

1. An image processing device comprising:
a processor, configured to;
acquire an image;
acquire a restoration filter corresponding to a transfer function of an imaging optical system, having at least one lens, used for generating the image; and
perform restoration processing on the acquired image through the acquired restoration filter,
wherein in the imaging optical system, in a case where a first modulation transfer function (MTF) curve indicating an MTF value in a first azimuth direction with respect to an amount of defocus from a focal position during focusing on an optical axis is compared with a second MTF curve indicating an MTF value in a second azimuth direction with respect to the amount of defocus from the focal position, a peak value of the second MTF curve is less than a peak value of the first MTF curve, a ratio of the peak value of the first MTF curve to the peak value of the second MTF curve is equal to or greater than 2, a half-value width of the second MTF curve is greater than a half-value width of the first MTF curve, and a ratio of the half-value width of the second MTF curve to the half-value width of the first MTF curve is equal to or greater than 1.25, and
wherein the restoration filter is a common filter corresponding to a representative value of transfer functions in a plurality of same type imaging optical systems including the imaging optical system.

2. The image processing device according to claim 1, wherein the first azimuth direction is a circumferential direction of a circle centered on the optical axis of the imaging optical system, and the second azimuth direction is a radial direction of the circle.

3. The image processing device according to claim 1, wherein the restoration filter is a zero-phase restoration filter that makes the restoration processing non-executable on the acquired image in terms of the phase.

4. The image processing device according to claim 1, wherein the ratio of the peak value of the first MTF curve to the peak value of the second MTF curve is equal to or greater than 4.

5. The image processing device according to claim 1, wherein the ratio of the peak value of the first MTF curve to the peak value of the second MTF curve is equal to or greater than 10.

6. The image processing device according to claim 1, wherein the ratio of the half-value width of the second MTF curve to the half-value width of the first MTF curve is equal to or greater than 3.

7. An image processing system comprising:
an imaging optical system, having at least one lens, that, in a case where a first modulation transfer function (MTF) curve indicating an MTF value in a first azimuth direction with respect to an amount of defocus during focusing on an optical axis is compared with a second MTF curve indicating an MTF value in a second azimuth direction with respect to the amount of defocus, a peak value of the second MTF curve is less than a peak value of the first MTF curve, a ratio of the peak value of the first MTF curve to the peak value of the second MTF curve is equal to or greater than 2, a half-value width of the second MTF curve is greater than a half-value width of the first MTF curve, and a ratio of the half-value width of the second MTF curve to the half-value width of the first MTF curve is equal to or greater than 1.25;

a processor, configured to:
acquire an image generated by using the imaging optical system;
acquire a restoration filter which is a common filter corresponding to a representative value of transfer functions in a plurality of same type imaging optical systems including the imaging optical system, the restoration filter corresponding to the transfer function of the imaging optical system; and
perform restoration processing on the acquired image through the acquired restoration filter.

8. An image processing method comprising:
acquiring an image generated using an imaging optical system, having at least one lens, that, in a case where a first modulation transfer function (MTF) curve indicating an MTF value in a first azimuth direction with respect to an amount of defocus during focusing on an optical axis is compared with a second MTF curve indicating an MTF value in a second azimuth direction with respect to the amount of defocus, a peak value of the second MTF curve is less than a peak value of the first MTF curve, a ratio of the peak value of the first MTF curve to the peak value of the second MTF curve is equal to or greater than 2, a half-value width of the second MTF curve is greater than a half-value width of the first MTF curve, and a ratio of the half-value width of the second MTF curve to the half-value width of the first MTF curve is equal to or greater than 1.25; and
performing restoration processing on the acquired image through a restoration filter which is a common filter corresponding to a representative value of transfer functions in a plurality of same type imaging optical systems including the imaging optical system, the restoration filter corresponding to the transfer function of the imaging optical system.

9. An imaging optical system group comprising:
an imaging optical system, having at least one lens, that, in a case where a first modulation transfer function (MTF) curve indicating an MTF value in a first azimuth direction with respect to an amount of defocus during focusing on an optical axis is compared with a second MTF curve indicating an MTF value in a second azimuth direction with respect to the amount of defocus, a peak value of the second MTF curve is less than a peak value of the first MTF curve, a ratio of the peak value of the first MTF curve to the peak value of the second MTF curve is equal to or greater than 2, a half-value width of the second MTF curve is greater than a half-value width of the first MTF curve, and a ratio of the half-value width of the second MTF curve to the half-value width of the first MTF curve is equal to or greater than 1.25; and
a storage medium that stores a restoration filter which is a common filter corresponding to a representative value of transfer functions in a plurality of same type imaging optical systems including the imaging optical system, the restoration filter corresponding to the transfer function of the imaging optical system.

* * * * *